(12) United States Patent
Rekow et al.

(10) Patent No.: US 9,206,885 B2
(45) Date of Patent: Dec. 8, 2015

(54) MULTI-MODE INFINITELY VARIABLE TRANSMISSION

(71) Applicant: Deere & Company, Moline, IL (US)

(72) Inventors: Andrew K. Rekow, Cedar Falls, IA (US); Rainer Gugel, Plankstadt (DE); Dennis L. Jeffries, Waterloo, IA (US); David Mueller, Stutensee (DE)

(73) Assignee: Deere & Company, Moline, IL (US)

( * ) Notice: Subject to any disclaimer, the term of this patent is extended or adjusted under 35 U.S.C. 154(b) by 117 days.

(21) Appl. No.: 14/145,599

(22) Filed: Dec. 31, 2013

(65) Prior Publication Data

US 2015/0184726 A1  Jul. 2, 2015

(51) Int. Cl.
*F16H 3/72* (2006.01)
*F16H 3/46* (2006.01)
*B60K 6/365* (2007.10)
*B60K 6/445* (2007.10)

(52) U.S. Cl.
CPC *F16H 3/72* (2013.01); *B60K 6/365* (2013.01); *B60K 6/445* (2013.01); *F16H 3/46* (2013.01); *F16H 3/728* (2013.01); *F16H 2200/20* (2013.01); *Y10S 903/911* (2013.01)

(58) Field of Classification Search
CPC ......... B60K 6/365; B60K 6/445; F16H 3/728
See application file for complete search history.

(56) References Cited

U.S. PATENT DOCUMENTS

| | | | |
|---|---|---|---|
| 4,164,155 A * | 8/1979 | Reed et al. | 475/24 |
| 4,164,156 A * | 8/1979 | Reed | 475/24 |
| 7,479,081 B2 * | 1/2009 | Holmes | 475/5 |
| 8,234,956 B2 | 8/2012 | Love et al. | |
| 8,734,281 B2 * | 5/2014 | Ai et al. | 475/5 |
| 8,784,246 B2 | 7/2014 | Treichel et al. | |
| 9,002,560 B2 * | 4/2015 | Hasegawa | 701/22 |
| 2012/0157254 A1 | 6/2012 | Aitzetmueller et al. | |
| 2014/0128196 A1 | 5/2014 | Rintoo | |
| 2015/0006007 A1 * | 1/2015 | Kitahata et al. | 701/22 |
| 2015/0072823 A1 | 3/2015 | Rintoo | |
| 2015/0142232 A1 * | 5/2015 | Tabata et al. | 701/22 |

FOREIGN PATENT DOCUMENTS

| | | |
|---|---|---|
| EP | 2466168 | 6/2012 |
| EP | 2466169 | 6/2012 |
| WO | 2012171812 | 12/2012 |

* cited by examiner

*Primary Examiner* — Derek D. Knight
(74) *Attorney, Agent, or Firm* — Ingrassia, Fisher & Lorenz PC

(57) ABSTRACT

An infinitely variable transmission includes a clutch, a brake and a first planetary gear set, including first and second components, and a double planetary gear set, including input and output components and additional third and fourth components. The first component receives power from an engine. The double planetary set sums mechanical power from the first planetary set and an infinitely variable power source ("IVP"). The third component receives mechanical power from a IVP. The second component directly transmits power to the input component. The clutch directly controls power transmission between the first and second components. The brake engages the fourth component to stop its rotation. The output component receives mechanical power directly from the input component and the fourth component. During operation of the engine, controlled actuation of the brake and the clutch causes the output component to be powered by the infinitely variable power source but not by the engine.

20 Claims, 8 Drawing Sheets

MULTI-MODE INFINITELY VARIABLE TRANSMISSION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to infinitely variable transmissions, including transmissions for the operation of vehicles in multiple powered modes.

BACKGROUND OF THE DISCLOSURE

It may be useful, in a variety of settings, to utilize both a traditional engine (e.g., an internal combustion engine) and an infinitely variable power source (e.g., an electric or hydrostatic motor, a variable chain drive, and so on) to provide useful power. For example, a portion of engine power may be diverted to drive a first infinitely variable machine (e.g., a first electric machine acting as a generator), which may in turn drive a second infinitely variable machine (e.g., a second electric machine acting as a motor using electrical power from the first electrical machine). In certain configurations, power from both of types of sources (i.e., an engine and an infinitely variable power source) may be combined for final power delivery (e.g., to a vehicle axle) via an infinitely variable transmission ("IVT") or continuously variable transmission ("CVT"). This may be referred to as "split-mode" or "split-path mode" operation because power transmission may be split between the mechanical path from the engine and the infinitely variable path. Split-mode operation may be attained in various known ways. For example, a planetary gear set may be utilized to sum rotational power from an engine and from an electric machine, with the summed power transmitted downstream within an associated power train. This may allow for delivery of power (e.g., to vehicle wheels) with an infinitely variable effective gear ratio. Various issues may arise, however, including limitations relating to the maximum practical speed of variable power sources.

SUMMARY OF THE DISCLOSURE

An infinitely variable transmission is disclosed. According to one aspect of the disclosure, an infinitely variable transmission includes a first planetary gear set including a first transmission component and a second transmission component, and a double planetary gear set having an input component, an output component, a third transmission component, and a fourth transmission component. The infinitely variable transmission also includes a clutch and a brake. The first transmission component receives a first mechanical power input for the first planetary gear set from an engine. The third transmission component receives a second mechanical power input for the double planetary gear set from an infinitely variable power source. The second transmission component directly transmits power to the input component of the double planetary gear set. The clutch is configured to engage the first transmission component and the second transmission component in order to control power transmission between the first transmission component and the second transmission component. The brake is configured to engage the fourth transmission component in order to stop rotation of the fourth transmission component. The output component is configured to receive mechanical power directly from the input component and the fourth transmission component. The double planetary gear set is configured to sum mechanical power from the engine and the infinitely variable power source and provide the summed power to the output component. During operation of the engine, controlled actuation of one or more of the first brake and the clutch causes the output component to be powered by the infinitely variable power source but not by the engine.

One or more of the following features may also be included in the disclosed transmission. The first transmission component may include a first planet gear carrier supporting one or more first planet gears. The second transmission component may include a first sun gear. The input component may include a first ring gear. The third transmission component may include a second sun gear. The fourth transmission component may include a second ring gear. The output component of the double planetary gear set may include a second planet gear carrier supporting one or more second planet gears, the one or more second planet gears being meshed with one or more of the input component and the fourth transmission component. The output component may transmit mechanical power to a gear box including one or more gears. The infinitely variable power source may include one or more of a pair of electric machines and a hydrostatic machine.

According to another aspect of the disclosure, an infinitely variable transmission includes a first planetary gear set including a first input component, a first output component, and a first transmission component. The infinitely variable transmission includes a double planetary gear set, including a second input component, a second transmission component, a third transmission component, and a second output component. The infinitely variable transmission also includes a first clutch, a second clutch, and a brake. The first input component receives a first mechanical power input for the first planetary gear set from an engine. The second input component receives mechanical power directly from the first output component. One or more of the first clutch, the second clutch and the brake are configured to engage one or more of the first input component, the first output component, and the first transmission component, in order to control mechanical power transmission between the engine and the double planetary gear set. One or more of the second and third transmission components receive a second mechanical power input for the double planetary gear set from an infinitely variable power source. The double planetary gear set is configured to sum mechanical power from the engine and the infinitely variable power source and provide the summed power to the second output component. During operation of the engine, controlled actuation of one or more of the first clutch, the second clutch, and the brake causes the second output component to be powered by the infinitely variable power source but not by the engine.

The first input component may include a first sun gear, the first clutch being configured to engage the first sun gear to control mechanical power transmission between the first sun gear and the engine. The first transmission component may include a first ring gear, the brake being configured to engage the first ring gear in order to stop rotation of the first ring gear. The first output component may include a first planet gear carrier, the second clutch being configured to engage the first planet gear carrier and the first ring gear in order to control mechanical power transmission between the first planet gear carrier and the first ring gear. The second input component may include a second planet gear carrier, the second planet gear carrier configured to receive mechanical power directly from both the second transmission component and a fourth transmission component included in the double planetary gear set. The second transmission component may include a second sun gear. The fourth transmission component may include a second ring gear. The second input component may directly transmit mechanical power to a third ring gear included in the double planetary gear set. The third transmission component may include a third sun gear. A third planet gear carrier supporting one or more planet gears may be included in the double planetary gear set, the one or more planet gears being meshed with the third ring gear and the third sun gear.

The infinitely variable transmission may further include a third clutch configured to engage the second output component and a fourth clutch configured to engage the second output component. Controlled actuation of the third and fourth clutch may control a flow path of mechanical power through the double planetary gear set to the second output component. The third clutch may be configured to engage a third planet gear carrier for transmission of mechanical power between the third planet gear carrier and the second output component. The second control clutch may be configured to controllably engage a second ring included in the double planetary gear set for transmission of mechanical power between the second ring gear and the second output component.

According to another aspect of the disclosure, an infinitely variable transmission includes a double planetary gear set including a first input component, a second input component, and an output component. The infinitely variable transmission includes a clutch, a first brake, and a second brake. The first input component is configured to receive a first mechanical power input for the double planetary gear set from an engine. The clutch is configured to engage the first input component in order to control mechanical power transmission between the first input component and an engine. The second input component receives a second mechanical power input for the double planetary gear set from an infinitely variable power source. The double planetary gear set is configured to sum mechanical power from the engine and the infinitely variable power source and provide the summed power to the output component. During operation of the engine, controlled actuation of one or more of the clutch, the first brake and the second brake causes the output component to be powered by the infinitely variable power source but by not the engine.

The double planetary gear set may include a first sun gear, a second sun gear, a first ring gear, a second ring gear, a first planet gear carrier supporting one or more first planet gears, and a second planet gear carrier supporting one or more second planet gears. The first input component may include the first sun gear. The second input component may include the second sun gear. The output component may include the second planet gear carrier. The one or more second planet gears are meshed with the second sun gear and the first ring gear. The first ring gear may be integral with the first planet gear carrier. The one or more first planet gears are meshed with the first sun gear and the second ring gear. The first brake may be configured to engage one or more of the second ring gear and the first planet gear carrier in order to control relative motion of the second ring gear and the first planet gear carrier. The second brake may be configured to engage the second ring gear in order to stop rotation of the second ring gear.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
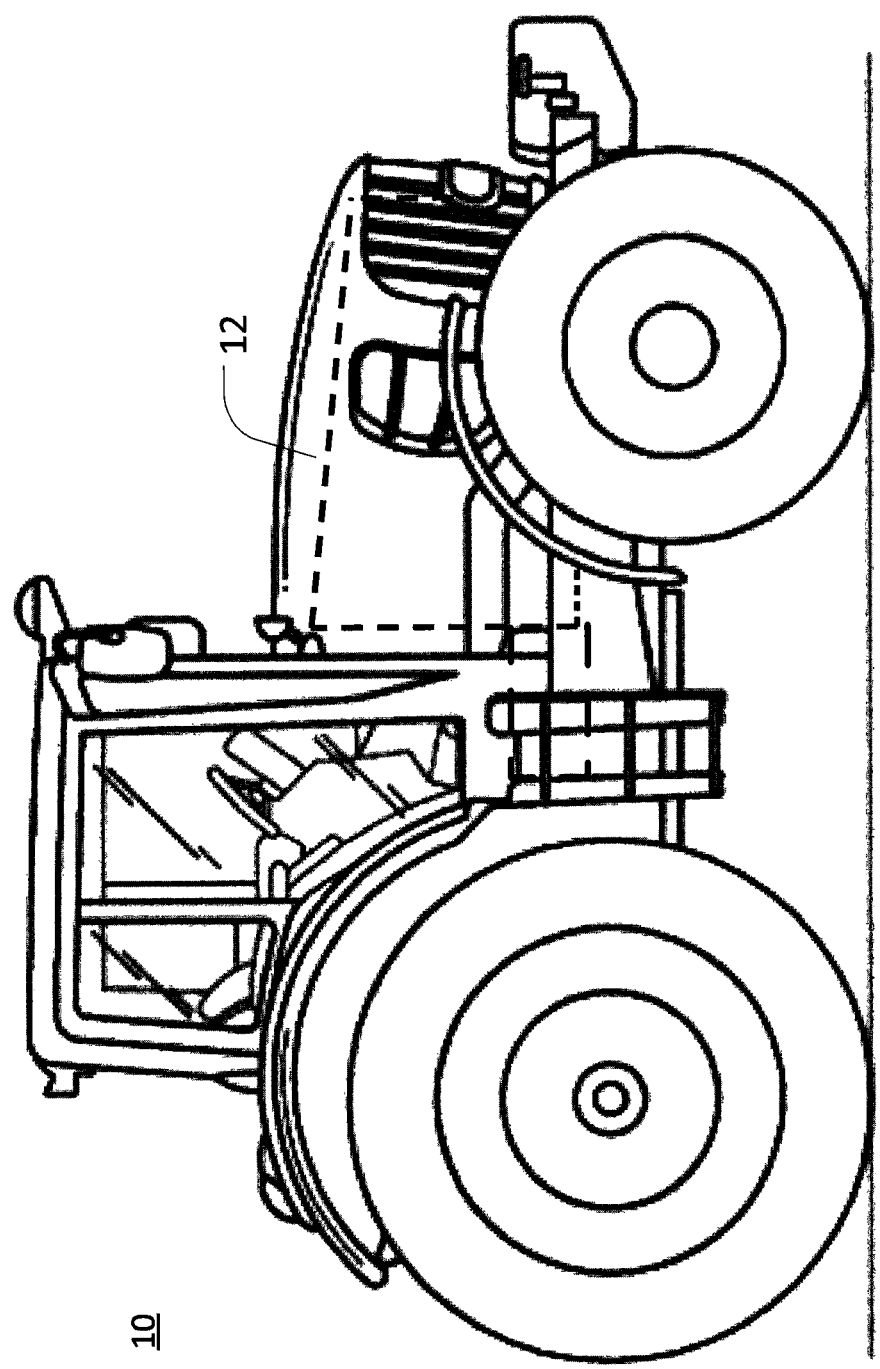
FIG. 1 is a side view of an example vehicle that may include an infinitely variable transmission.

The following describes one or more example embodiments of the disclosed multi-mode infinitely variable transmission ("MIVT"), as shown in the accompanying figures of the drawings described briefly above. Various modifications to the example embodiments may be contemplated by one of skill in the art.

In various known configurations, one or more planetary gear sets may be utilized to combine the power output of an infinitely variable power source ("IVP") and an engine (e.g., an internal combustion engine). For example, in a planetary gear set a first component of the gear set (e.g., a ring gear) may receive power from the engine, a second component of the gear set (e.g., a sun gear) may receive power from the IVP, and a third component of the gear set (e.g., a planet gear carrier) may sum the power from the engine and the IVP at the output of the gear set. (For convenience of notation, "component" may be used herein, particularly in the context of a planetary gear set, to indicate an element for transmission of power, such as a sun gear, a ring gear, or a planet gear carrier.) It will be understood that such a configuration may allow for an essentially infinite (and continuous) number of gear ratios for the planetary gear set. For example, for a fixed engine speed, a particular gear ratio may be set by varying the speed of the IVP with respect to the engine speed.

In certain instances, it may be useful to facilitate a powered-zero mode for a vehicle (or other machinery), in which the output speed of the vehicle wheels (or other machinery output) reaches zero speed without stopping the engine or releasing torque at the wheels. In this way, for example, vehicle power may be utilized to hold a vehicle stationary. Such a state may be obtained, for example, with a planetary gear set configured as described above. For example, if an engine is spinning a sun gear at a first positive speed and a IVP is directed to spin a ring gear at an equivalent negative speed, an associated planet gear carrier (which may, for example, be connected to a differential drive shaft) may not spin at all. Further, if the electric motor spins at a slightly different (and opposite) speed from the engine, the vehicle may enter a "creeper" mode, in which the vehicle moves very slowly but with high wheel torque. The powered-zero and creeper modes are particularly useful for heavy-duty work vehicles, such as the tractor shown in FIG. 1, used in the agricultural, construction and forestry industries. With increasing wheel speed, the vehicle may then, eventually, enter a normal drive mode. In traditional configurations, each of these modes may be split-path modes, in which power transmission is split between a purely mechanical path from the engine and the mixed path through the IVP.

One issue relating to infinitely variable power trains may concern the relative efficiency of power transmission in various modes. It will be understood, for example, that mechanical transmission of power from an engine to a gear set (i.e., mechanical path transmission) may be a highly efficient mode of power transmission, whereas transmission of power through a IVP may be less efficient (e.g., because the mechanical power must be converted to electrical or hydraulic power by a first machine, transmitted to a second machine, and then converted back to mechanical power). Accordingly, there may exist significant motivation to utilize the mechanical path more heavily than the IVP path (e.g., by increasing the speed of the engine). However, this heavier utilization of the mechanical path may also drive up the required IVP speed for powered-zero and creeper modes, because these modes may require near or actual speed matching between the IVP and engine speeds. This may lead to increased wear on related gears and other parts (e.g., a planetary gear component receiving power from the IVP and associated bearings), even to the point of part failure. Further, to attain appropriate speeds, the size and power of a relevant IVP may need to be significantly increased from a preferred size and power. Among other advantages, the MIVT disclosed herein may address these issues. For example, through selective use of clutches and/or brakes, an MIVT may allow heavier utilization of a mechanical path, while avoiding the need for excessive IVP speeds in powered-zero and creeper modes.

As will become apparent from the discussion herein, a MIVT may be used advantageously in a variety of settings and with a variety of machinery. For example, referring now to FIG. 1, a MIVT may be included in the power train 12 of vehicle 10. In FIG. 1, vehicle 10 is depicted as a tractor. It will be understood, however, that other configurations may be possible, including configuration of vehicle 10 as a different kind of tractor, as a log skidder, as a grader, or as one of various other work vehicle types. It will further be understood that the disclosed IVT may also be used in non-work vehicles and non-vehicle applications (e.g., fixed-location power trains).

As also noted above, one advantage of the disclosed MIVT is that it may allow operation of a vehicle in a variety of powered modes (e.g., powered-zero mode, creeper mode, and split-path drive mode), which may utilize various combinations of engine and IVP power. For example, through the use of various clutches and/or brakes associated with one or more planetary gear sets, an MIVT may permit engine power to be disconnected from a IVT output, even while the engine continues to operate. For example, if a IVP drives a first component of a planetary gear set and an engine drives a second component of the planetary gear set, in certain embodiments and modes a clutch may disconnect the operating engine from the second component and a brake may stop rotation of a third component of the gear set, thereby allowing delivery of power solely from the IVP through the gear reduction of the planetary gear set. In this way, for example, only electrical power (or hydraulic power, and so on) may be utilized to drive (or hold) vehicle 10 in certain modes, while combined electrical and engine power may be utilized to drive (or hold) vehicle 10 in other modes. As such, among other benefits, an MIVT may avoid certain previous limitations on the fraction of power that may diverted from an engine through an electric path (or hydraulic path, and so on).

Figure 2:
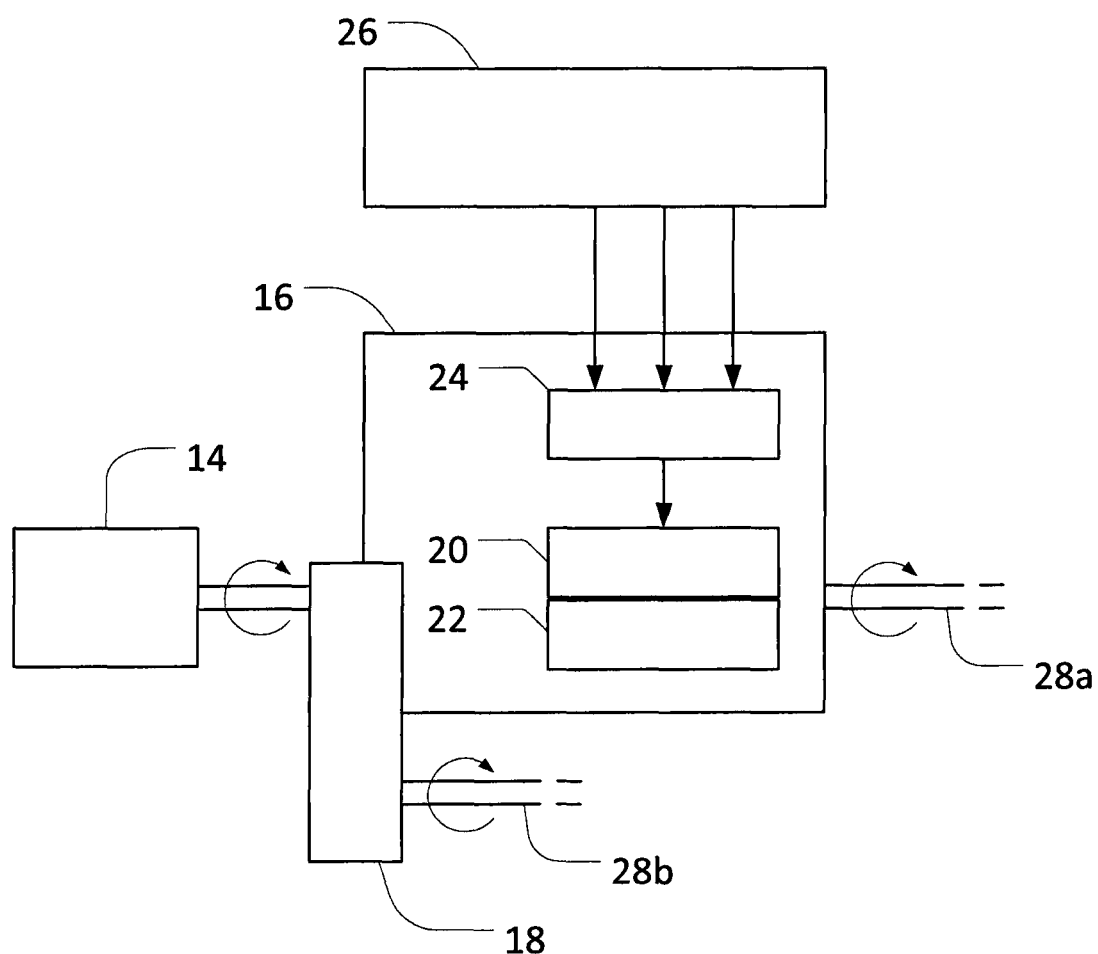
FIG. 2 is a schematic view of a power train of the vehicle of FIG. 1.

Referring now to FIG. 2, various components of an example power train 12 are depicted. For example, engine 14 may provide mechanical power (e.g., via a rotating shaft) to MIVT 16. Engine 14 may also provide mechanical power to IVP 18, which may include one or more IVP machines (e.g., an electric motor and generator, or hydrostatic machine having a hydrostatic motor and associated pump). MIVT 16 may additionally receive mechanical power from IVP 18.

MIVT 16 may include various clutches 20 and brakes 22, which may be controlled by various actuators 24. Actuators 24, in turn, may be controlled by transmission control unit ("TCU") 26, which may receive various inputs from various sensors or devices (not shown) via a CAN bus (not shown) of vehicle 10. MIVT 16 may include one or more output shafts 28a for transmission of mechanical power from MIVT 16 to various other components (e.g., a differential drive shaft). In certain embodiments, additional gear sets (e.g., a set of range gears) may be interposed between MIVT 16 and other parts of vehicle 10 (e.g., a differential drive shaft). In certain embodiments, IVP 18 may also provide power directly to other parts of vehicle 10 (e.g., via direct IVP drive shaft 28b).

Figure 3:
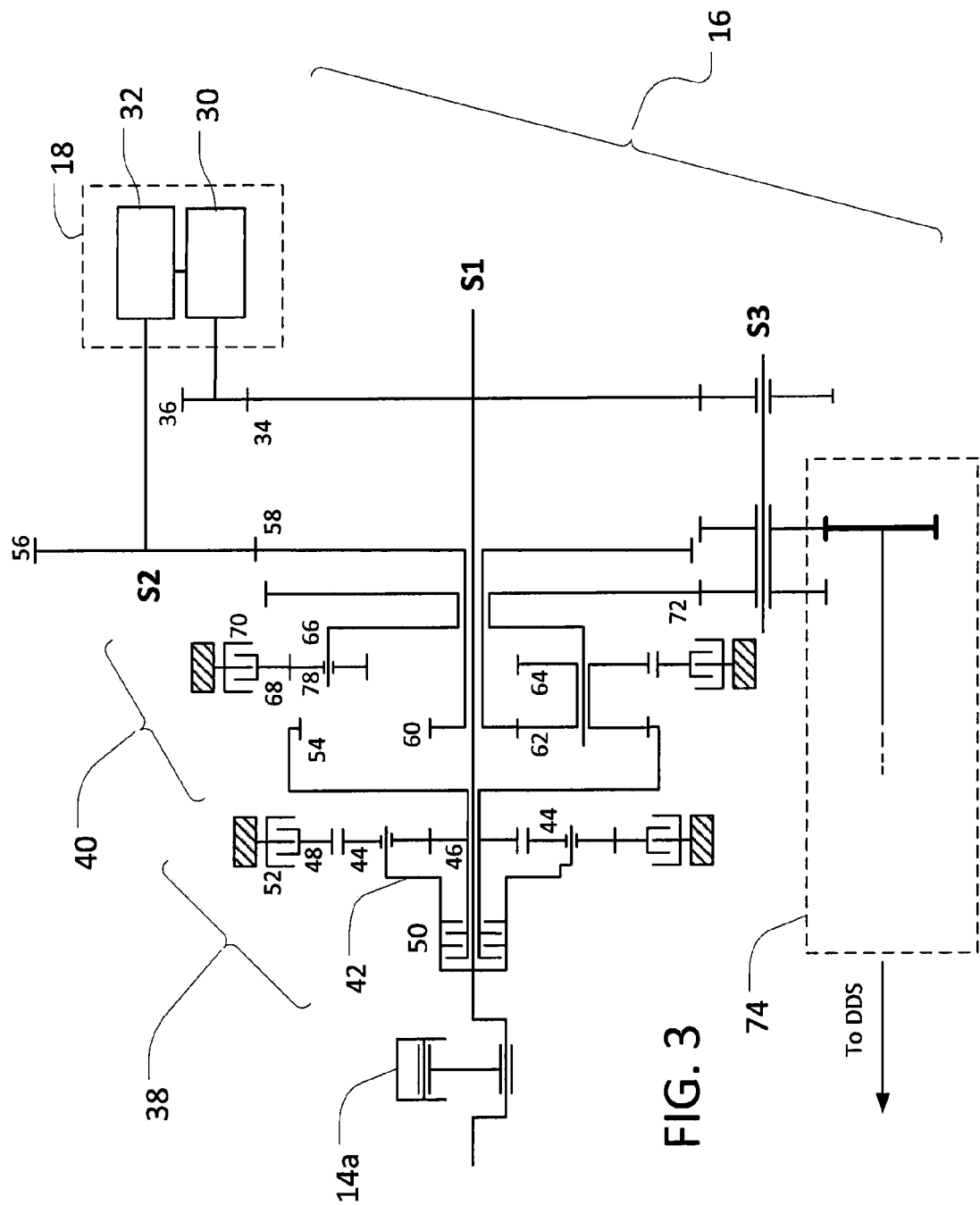
FIG. 3 is a schematic view of an infinitely variable transmission that may be included in the power train of FIG. 2.

Referring now to FIG. 3, various internal components of an embodiment of MIVT 16 are presented. It should be noted that the schematic representations of the transmission shown in FIG. 3 (and also the transmissions shown in FIGS. 5 and 7) illustrate example implementations in simplified form for clarity, and thus may not depict all of the components associated with the represented transmission. Engine 14 may include internal combustion engine 14a, which may provide mechanical power directly to shaft S1. (As used herein, "direct" power transmission may include transmission of power by direct physical connection, integral formation, or via a simple intervening element such as an idler gear or planet gear. In contrast, for example, power transmission between a ring gear of a planetary gear set and a sun gear of the planetary gear set via a planet gear carrier (and associated planet gears) of the planetary gear set may not be considered "direct.") IVP 18 may include electric generator 30 and electric motor 32. Electric generator 30 may receive mechanical power via gear 36 and gear 34, attached to shaft S1, and may generate electrical power for transmission to electric motor 32. Electric motor 32 may convert the received electrical power to mechanical power and thereby rotate shaft S2.

Although specific terms such as "generator" and "motor" may be used herein to describe various example configurations, it will be understood that these (and similar) terms may be used to refer generally to an electrical machine that may be capable of operating either as a generator or as a motor. For example, electric generator 30 may sometimes operate as an electric motor, and electric motor 32 may sometimes operate as a generator. Likewise, it will be understood that the actual operating modes of other infinitely variable power sources may similarly vary from those explicitly described herein.

In certain embodiments, MIVT 16 may include planetary gear set 38 and double planetary gear set 40. In certain embodiments, planetary gear set 38 and double planetary gear set 40 may be configured to sum mechanical power from engine 14a and IVP 18. Through the use of one or more associated clutches and/or brakes, MIVT 16 may provide an output, in certain modes, that utilizes only power from IVP 18.

Planetary gear set 38 may include, for example, planet gear carrier 42 holding planet gears 44, which may be meshed with sun gear 46 and ring gear 48. Drive clutch 50 may be configured to engage planet gear carrier 42 and sun gear 46 (e.g., based upon signals from TCU 26) in order to control power transmission between these gears. For example, in a fully engaged state, drive clutch 50 may lock planet gear carrier 42 to sun gear 46. As depicted in FIG. 3, engine 14a may directly drive planet gear carrier 42 via shaft S1. Accordingly, engagement of clutch 50 may effectively lock sun gear 46 to shaft S1 and the output of engine 14a. Reverse brake 52 may be anchored to a fixed housing of MIVT 16 (or another feature) and may be configured to engage to stop the rotation of ring gear 48.

In certain embodiments, an output component of planetary gear set 38 may directly transmit power to an input component of double planetary gear set 40. For example, sun gear 46 may be integrally connected with ring gear 54, thereby directly connecting an output of planetary gear set 38 (i.e., sun gear 46) to an input to double planetary gear set 40 (i.e., ring gear 54).

Double planetary gear set 40 may also receive power input from IVP 18. For example, electric motor 32 may drive the rotation of shaft S2, along with attached gear 56. Gear 56 may be meshed with gear 58, mounted to shaft S1, and gear 58 may directly transmit power to (e.g., may be integrally formed with) sun gear 60 of double planetary gear set 40. Sun gear 60 may mesh with planet gears 62 (one shown), which may be directly connected with planet gears 64 (one shown), both sets of planet gears 62 and 64 being carried by planet gear carrier 66. Each of planet gears 64 may mesh with one of planet gears 78, which in turn may mesh with ring gear 68. Planet gear carrier 66 connect to ring gear 68 (e.g., via planet gears 64 and 78), and creeper brake 70 may be anchored to a fixed housing of MIVT 16 (or another feature) and configured to engage ring 68 to stop the rotation of that component.

Planet gear carrier 66 may provide a mechanical power output from double planetary gear set 40 for transmission of mechanical power to various parts of vehicle 10. For example, planet gear carrier 66 may be integrally connected with output gear 72, which may be meshed with a gear along idler shaft S3. In certain embodiments, additional gear box 74 (e.g., a range gear box) may be interposed between MIVT 16 and other parts of vehicle 10 (e.g., a differential drive shaft ("DDS")) or may be included as part of MIVT 16. In this way, for example, various gear shifts may be implemented over the baseline infinitely variable gear ratio provided by MIVT 16.

In certain modes of operation, MIVT 16 (as configured in FIG. 3) may provide for powered-zero and creeper modes in which only power from IVP 18 is provided to the wheels of vehicle 10. For example, drive clutch 50 may be disengaged and brake 70 may be engaged with ring gear 68 (or, in certain configurations, with ring gear 54 (not shown)). This may, accordingly, disconnect engine 14a from double planetary gear set 40, while providing a fixed gear (e.g., ring gear 68) around which the components of double planetary gear set 40 may rotate. Mechanical power from IVP 18 may be provided to sun gear 60, which may drive planet carrier 66 around ring gear 68. This may, in turn, cause rotation of output gear 72, driven by IVP 18 but not engine 14a, which may allow for driving of the wheels of vehicle 10 (e.g., via gear box 74) using only power from IVP 18.

Next, in order to shift the vehicle out of this IVP-only mode, a reverse process to that described above may be executed. For example, drive clutch 50 may be engaged, thereby connecting engine 14a to sun gear 46 and ring gear 54. At the same time (or nearly the same time), creeper brake 70 may be disengaged, thereby allowing double planetary gear set 40 to provide an output at gear 72 that represents a sum of the power from IVP 18 and engine 14a. It will be understood that this selective use of two of a set of friction elements (e.g., clutches and brakes) may generally facilitate transition between various operating modes for vehicle 10.

In certain embodiments, it may be beneficial to effect a transition between modes (e.g., between an all-IVP creeper mode and a combined drive mode) in particular ways. For example, with drive clutch 50 engaged, it may be possible to spin sun gear 60 (via IVP 18) at a speed such that ring gear 68 essentially stops, even without use of brake 70. In order to provide for more seamless shifting between modes, it may be beneficial to shift between drive and creeper mode at such a point. In this way, for example, brake 70 may be engaged and clutch 50 may be disengaged with minimal disruption to vehicle operation. A similar seamless shift point may also be obtained for shifts from creeper to drive modes, and may represent a target point for those shift operations (and others). It will be understood, however, that in certain embodiments ramped (or other) modulation of clutch 50 (or other components) may be utilized.

In certain applications, it may be desirable to operate vehicle 10 in reverse, whether in creeper mode, drive mode, or otherwise. In MIVT 16 as depicted in FIG. 3, for example, it may be possible to engage reverse brake 52 for this purpose.

Figure 4:
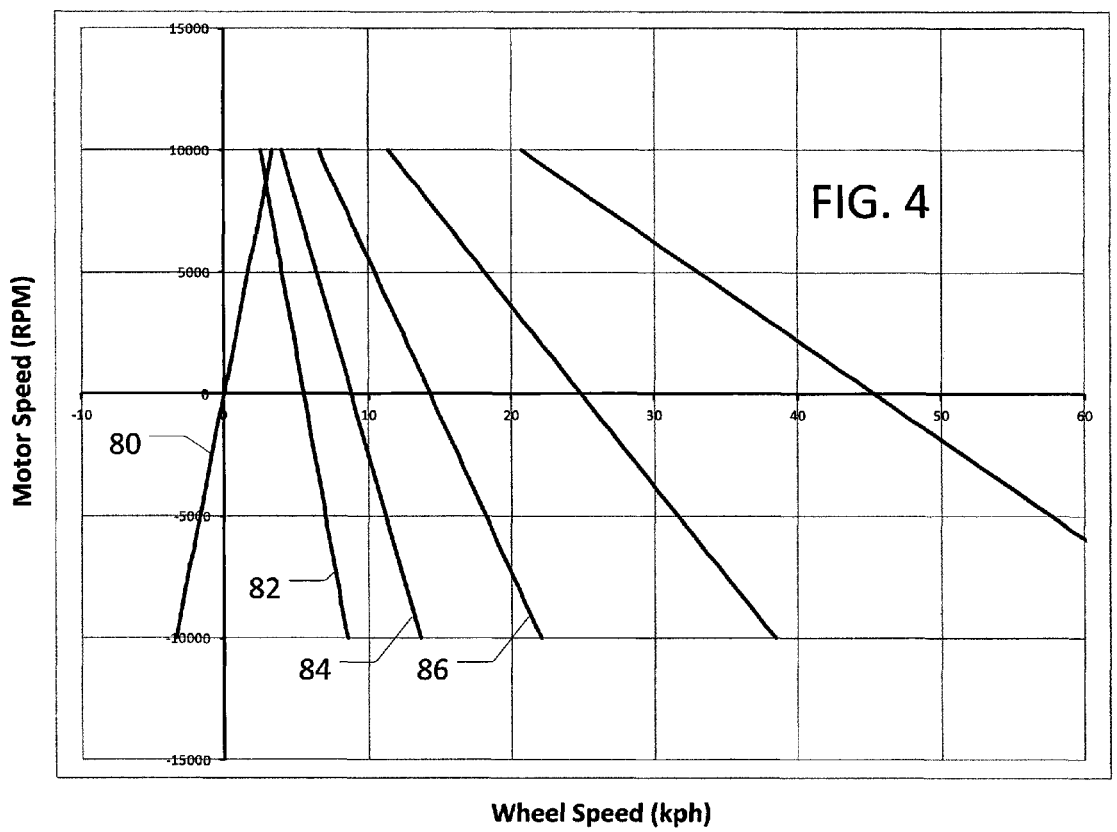
FIG. 4 is a graphical representation of infinitely variable power source speeds and vehicle wheel speeds for various modes of operation of the infinitely variable transmission of FIG. 3.

Referring now to FIG. 4, a graph is presented of the relationship between vehicle wheel speed (in kilometers per hour) and the speed of electric motor 32 (in revolutions per minute) for the configuration of MIVT 16 in FIG. 3. Various curves are presented for operation of vehicle 10 with various range gears (not shown) engaged within gear box 74. It will be understood that the quantities represented in FIG. 4 should be viewed as examples only.

Line 80, for example, may represent operation of the vehicle in a creeper mode (e.g., under electrical power only). It can be seen that at zero motor speed there may be zero vehicle speed, with non-zero motor speed directly proportional to vehicle speed. In creeper mode (e.g., with brake 70 engaged, drive clutch 50 disengaged, and an A range gear (not shown) in gear box 74 engaged), vehicle 10 may accelerate to a transition point. For example, as described above, vehicle 10 may accelerate to a point at which, based on the engine speed and relevant gear ratios, ring 68 may be relatively stationary even without engagement of brake 70. At this point (or another), brake 70 may be disengaged and clutch 50 engaged, thereby shifting the vehicle into split-mode drive relatively seamlessly. Motor 32 may then begin to decelerate along line 82, with vehicle speed (now driven in split-path mode by both motor 32 and engine 14a) increasing even as the speed of motor 32 changes direction (i.e., passes from positive rotation to negative rotation).

Continuing, vehicle 10 may be shifted from the A range gear in gear box 74 to a higher B range gear (not shown). To continue acceleration of vehicle 10, it may now be appropriate to switch the direction of the rotation of motor 32, thereby jumping from negative rotation and line 82 to positive rotation and line 84. Motor 32 may then be decelerated again, followed by a further shift to a higher C range gear in gear box 74 and a corresponding jump, for motor 32, from line 84 to 86. By modulating the rotation of motor 32 in this way, shifts between various range gears of gear box 74 may be accomplished with the same reduction ratio at the start of the shift (e.g., at the end of A range driving) as at the end of the shift (e.g., at the beginning of B range driving). (It will be understood that a reduction ratio may be the product of the gear ratios of the planetary gear sets 38 and 40 and the engaged gear (e.g., the A range gear) of gear box 74.)

Various benefits may obtain from the configuration of FIG. 3 (and others contemplated by this disclosure). For example, in the configuration of FIG. 3 (and other configurations) transmission 74 may be located downstream of planetary gear sets 38 and 40. This may allow the use of the full range of torques and speeds resulting at the output of MIVT 16 (i.e., as may result from the various combinations of the power of engine 14*a* and motor 32) with each range or gear of transmission 74. For example, an electric-only mode (or any of a variety of split-path modes) may be utilized with each range or gear of transmission 74. This may provide significant flexibility during vehicle operation.

Additionally, in the configuration of FIG. 3 (and other configurations) split-mode drive may be implemented using a relatively simple planetary path, which may decrease wear, improve life, and decrease costs for MIVT 16, among other benefits. This may be particularly useful, for example, for applications in which a majority of operating time is expected to be spent in split-path mode (e.g., for various agricultural operations conducted with vehicle 10). In split-path mode, for example, power from engine 14*a* may be provided through clutch 50 to ring gear 54, and power from motor 32 being provided to sun gear 60. These components (i.e., ring gear 54 and sun gear 60) may together cause rotation of planet carrier 66 (via planet gears 62), which in turn may cause rotation of gear 72 and the corresponding transfer of power into transmission 74. In contrast, in an electric-only mode, power from motor 32 may be provided to sun gear 60 and then, in turn, to planet gears 62, planet gears 64 (which may be directly connected to or integrally formed with gears 62), and planet gears 78. With ring gear 68 locked by brake 70, power may then flow from planet gears 62, 64 and 78 to planet carrier 66, and so on. In this way, it will be understood, fewer gear meshes may be utilized in the split-path power mode than in the electric-only mode, which may represent a relative improvement in power transfer efficiency and may also result in a relative decrease in part wear.

Figure 5:
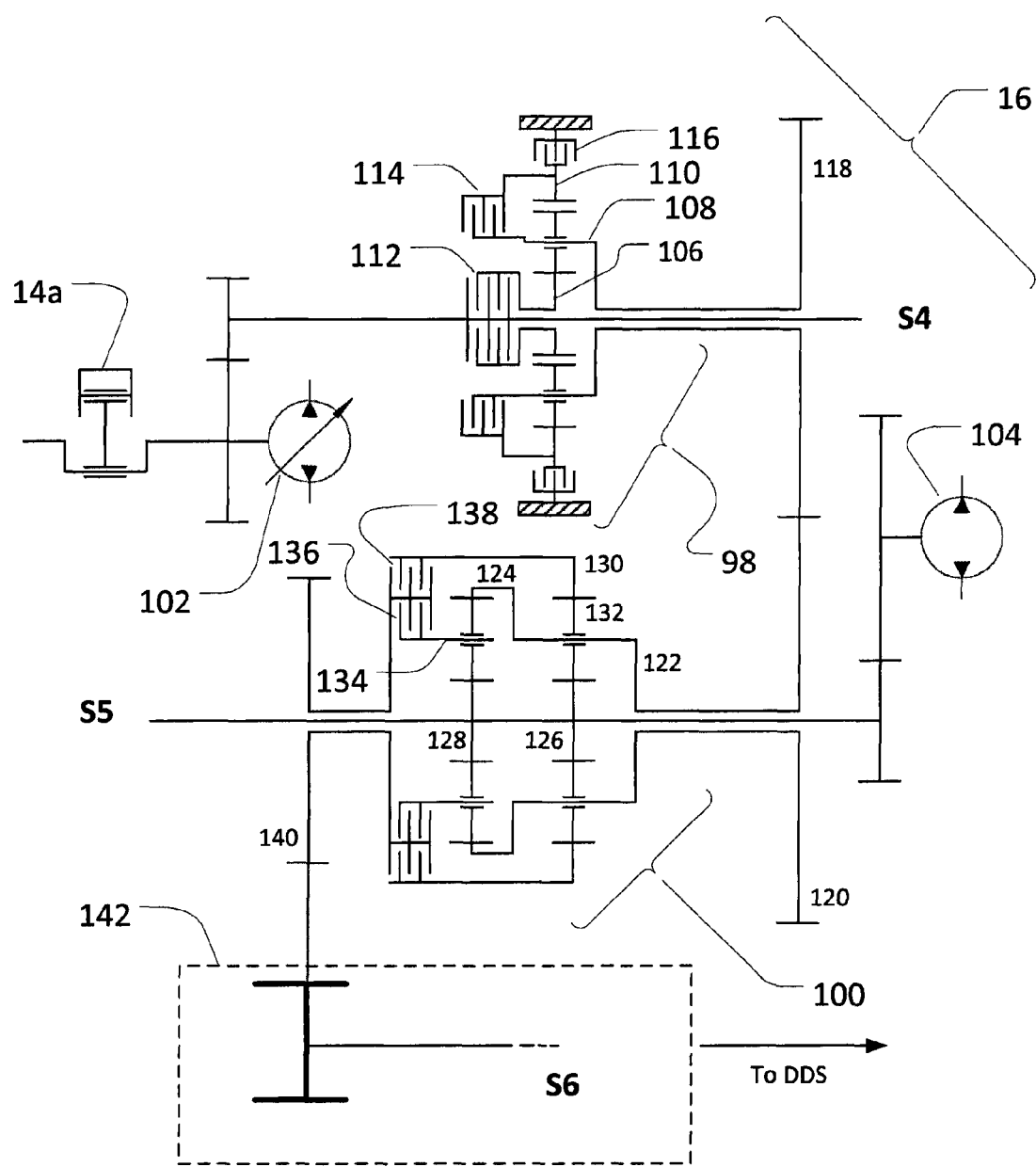
FIG. 5 is a schematic view of another infinitely variable transmission that may be included in the power train of FIG. 2.

Referring now also to FIG. 5, an additional example embodiment of MIVT 16 is presented. As depicted in FIG. 5, MIVT 16 may include planetary gear set 98 and double planetary gear set 100. Internal combustion engine 14*a* may directly drive both a hydrostatic drive (e.g., pump 102 and motor 104) and shaft S4, and hydrostatic drive motor 104 may drive shaft S5. Planetary gear set 98 may include sun gear 106, planet gear carrier 108, and ring gear 110. Drive clutch 112 may be configured to engage with shaft S4 in order to connect the output of engine 14*a* to sun gear 106. Creeper clutch 114 may be configured to engage both planet gear carrier 108 and ring gear 110, thereby potentially locking planet gear carrier 108 and ring gear 110 together. Reverse brake 116 may be configured to engage ring gear 110. In certain configurations, accordingly, reverse brake 116 may be utilized to reverse the output of planetary gear set 98 with respect to the output of engine 14*a*.

Planetary gear set 98 may include an output that is directly connected (e.g., directly geared to or integral with) an input to double planetary gear set 100. For example, as depicted in FIG. 5, planet gear carrier 108 may be an output component for planetary gear set 98 and may be directly geared (i.e., via gears 118 and 120) to planet gear carrier 122 of double planetary gear set 100. Further, in certain configurations, this input to gear set 100 may rotate directly with another component of gear set 100. For example, planet gear carrier 122 may be formed as an integral component with ring gear 124, such that both components rotate in unison.

Motor 104 may provide an additional input to double planetary gear set 100. For example, via shaft S5, motor 104 may provide input power to both of sun gears 126 and 128. Double planetary gear set may also include, for example, ring gear 130, and planet gear carrier 134.

In this configuration, similar to the discussion above regarding the embodiment of FIG. 3, various clutches and brakes associated with MIVT 16 may be utilized to switch between various operating modes for vehicle 10. For example, when drive clutch 112 is disengaged power may not be transmitted from operating engine 14*a* to planetary gear set 98 or double planetary gear set 100. Further, with creeper clutch 114 engaged and reverse brake 116 engaged, gear 118 may be locked. Accordingly, engagement of creeper clutch 114 and reverse brake 116 may prevent rotation of both ring gear 124 and planet gear carrier 122 (although planet gears 132 may still rotate around carrier 122). In this way, even though engine 14*a* may be operating, double planetary gear set 100 may transmit to output gear 140 only power from motor 104 (e.g., in either a forward or a reverse creeper-mode).

In certain embodiments, additional transmission components may be provided to facilitate various types of vehicle operation and operational modes. For example, low clutch 136 and high clutch 138 may be included within double planetary gear set 100, with high clutch 138 configured to engage both ring gear 130 and output gear 140, and with low clutch 136 configured to engage both planet gear carrier 134 and output gear 140. Accordingly, in creeper or other modes, clutches 136 and 138 may be selectively activated in order to adjust the effective total gear ratio of the two planetary gear sets 98 and 100.

In certain embodiments, gear box 142 may be interposed between double planetary gear set 100 and other parts of vehicle 10 (e.g., a DDS), and may include various gears (e.g., range gears). Also in certain embodiments, the configuration represented in FIG. 5 may allow transition between fixed gear ratios within gear box 142 (and in the context of the infinitely variable gear ratio provided by hydrostatic machine 102, 104) without necessarily changing the direction of rotation for motor 104. For example, vehicle 10 may start operation at zero speed, with engine 14*a* disconnected from the transmission (via clutch 112) and with clutch 114 and brake 116 engaged. Motor 104, accordingly, may provide the sole power to the output gear 140 (and gear box 142). Motor 104 may be started in the positive direction (for positive-direction creeper mode operation) or negative direction (for negative-direction creeper mode operation). Assuming, for example, an initial positive direction of travel, rotation of motor 104 (and thereby shaft S5) may accelerate in the positive direction, causing sun gears 126, 128 to also accelerate. Initially, for example, low clutch 136 may be engaged, whereby power may be transferred from sun gear 128, via planet gear carrier 134 to output gear 140. Within gear box 142, a first low range gear may be engaged, thereby completing the power transmission path from motor 104 to other parts of vehicle 10 (e.g., a differential drive shaft).

At a particular speed of motor 104, depending on the particular associated gear ratios, ring gear 110 may tend to be relatively stationary, even when brake 116 is not engaged. As also noted above, this may provide a useful point at which to transition between operation modes (e.g., creeper mode and split-path mode) or various gears (e.g., range gears within gear box 142). Accordingly, continuing the example above, once motor 104 has accelerated through creeper mode to such a speed-matched point (or at various other times), reverse brake 116 may be disengaged and drive clutch 112 may be engaged. This may provide a mechanical transmission path for power from engine 14a to double planetary gear set 100. At the same time (or nearly the same time), low clutch 136 may also be disengaged and high clutch 138 may be engaged. However, due to the configuration represented in FIG. 5, it may not be necessary at this point to reverse the rotational direction of motor 104 in order to continue forward acceleration of vehicle 10 (as it may be, for example, for the configuration represented in FIG. 3). In certain embodiments, after engagement of clutch 112 (i.e., entry into a split-path mode), the rotational speed of motor 104 may simply be decelerated from the rotational speed at the time of the transition, with vehicle 10 accelerating accordingly.

Figure 6:
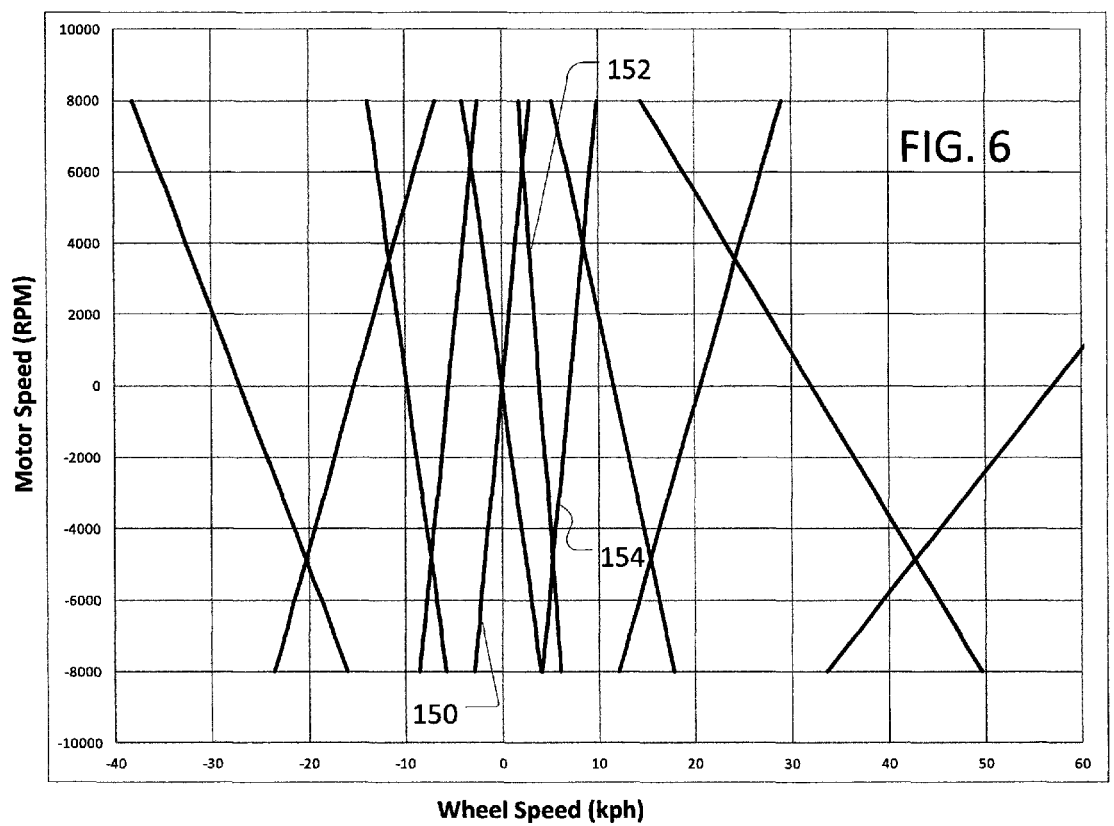
FIG. 6 is a graphical representation of infinitely variable power source speeds and vehicle wheel speeds for various modes of operation of the infinitely variable transmission of FIG. 5.

Referring now to FIG. 6, for example, a graph is presented of the relationship between vehicle wheel speed (in kilometers per hour) and the speed of motor 104 (in revolutions per minute) for the configuration of MIVT 16 in FIG. 5. Various curves are presented for operation of vehicle 10 with various gears (e.g., range gears) engaged within gear box 142. It will be understood that the quantities represented in FIG. 6 should be viewed as examples only.

Line 150, for example, may represent operation of vehicle 10 in a creeper mode (e.g., under hydrostatic power only). It can be seen that at zero motor speed there may be zero vehicle speed, with non-zero motor speed being directly proportional to vehicle speed. In creeper mode (e.g., with reverse brake 116 and creeper clutch 114 engaged, drive clutch 112 disengaged, and an A range gear (not shown) in gear box 142 engaged), the vehicle may accelerate to a transition point. In certain embodiments, this may be a point at which, based on the engine speed and relevant gear ratios, ring gear 110 may be relatively stationary even without engagement of brake 116. At this transition point (or another), brake 116 may be disengaged and clutch 112 engaged, thereby shifting the vehicle into split-mode drive. Motor 104 may then begin to decelerate along line 152, with vehicle speed (now driven by both motor 104 and engine 14a) increasing even as the speed of motor 104 changes direction (i.e., passes from positive rotation to negative rotation).

Continuing, the vehicle may be shifted from the former A range gear in gear box 142 to a higher B range gear (not shown). To continue acceleration of vehicle 10, it may again be appropriate to switch the direction acceleration of the rotation of motor 104 (but not, immediately, the direction of rotation of motor 104), and engage an appropriate B range (with or without switching among clutches 136 and 138). Motor 104 may then accelerate along line 154, with vehicle 10 accelerating accordingly.

Figure 7:
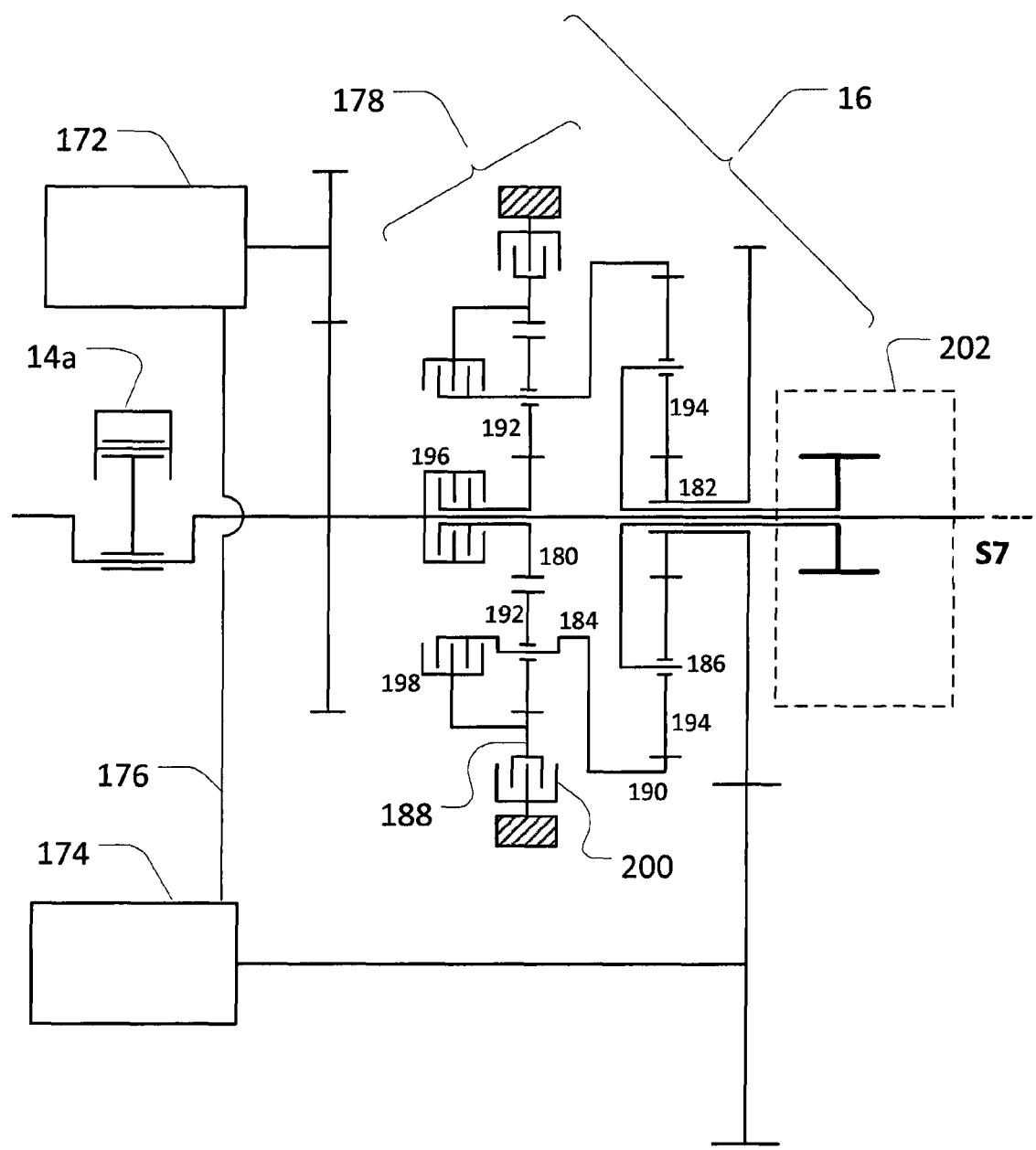
FIG. 7 is a schematic view of another infinitely variable transmission that may be included in the power train of FIG. 2.

Referring now to FIG. 7, an additional example embodiment of MIVT 16 is presented. As depicted in FIG. 7, internal combustion engine 14a may provide mechanical power to electric generator 172, which may provide electrical power to electric motor 174 via power cable 176. Motor 174 may (e.g., via direct gearing) drive rotation of sun gear 182 of double planetary gear set 178. Gear set 178 may also be configured to receive mechanical power from engine 14a via shaft S7, with drive clutch 196 configured to engage both shaft S7 and sun gear 180. Planet gear carrier 184, including planet gears 192 may be directly connected to (e.g., integral with) ring gear 190, which may itself be configured to receive power from sun gear 182 via planet gear carrier 186. Ring gear 188 may be meshed with planet gears 192. Further, planet gear carrier 186 may form an output component of gear set 178 and may, for example, be directly connected to (e.g., integrally formed with) an input component of gear box 202.

As in other embodiments discussed herein, a number of clutches and brakes within MIVT 16 (e.g., as represented in FIG. 7) may allow for useful transition between various operating modes, including a creeper mode powered only by motor 174 and a split-path mode powered by both motor 174 and engine 14a. For example, clutch 196 may engage with shaft S7 and sun gear 180 in order to transmit power from engine 14a to double planetary gear set 178. Likewise, clutch 198 may engage both ring gear 188 and planet gear carrier 184 in order to lock these components together. Finally, reverse brake 200 may engage ring gear 188 in order to stop rotation of that gear.

In this light, it will be understood that clutch 198, brake 200 and clutch 196 may be selectively engaged (and disengaged) in order to provide for various modes of operation. For example, with clutch 196 disengaged and both clutch 198 and reverse brake 200 engaged, vehicle 10 may be driven under the power only of motor 174. Likewise, other operational modes may be possible with various other configurations (e.g., various combinations in which two of clutch 198, brake 200, and clutch 196 are engaged).

Figure 8:
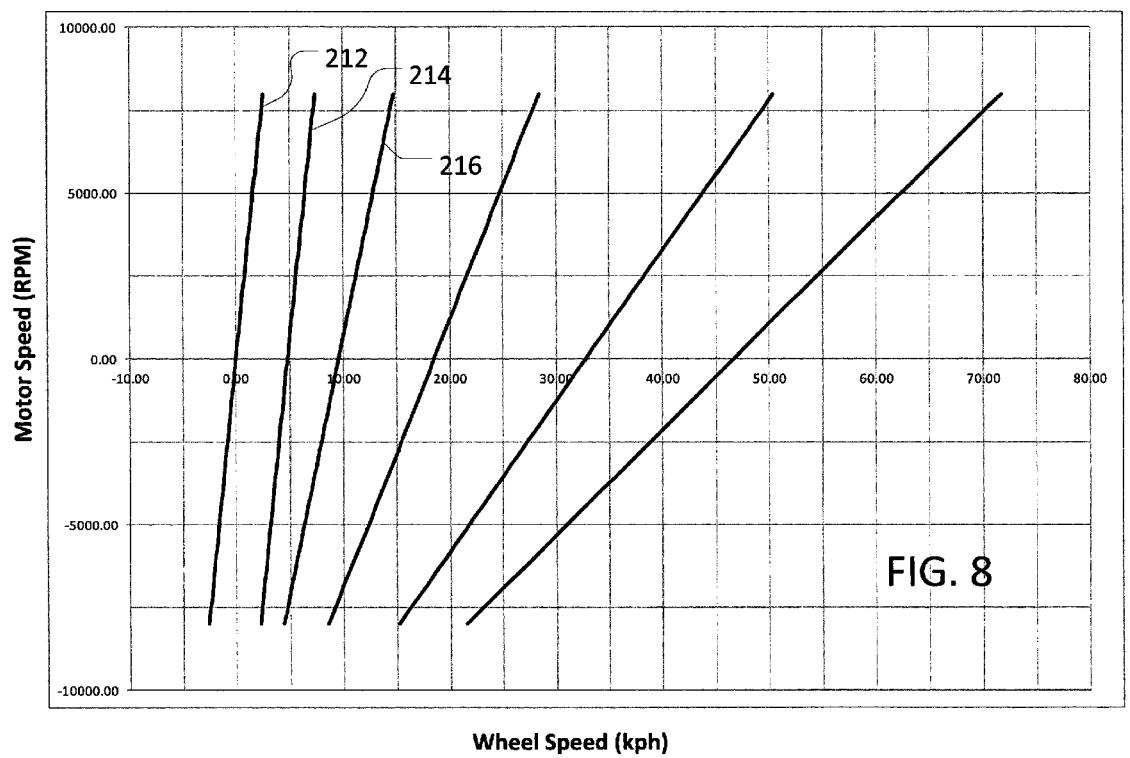
FIG. 8 is a graphical representation of variable power source speeds and vehicle wheel speeds for various modes of operation of the infinitely variable transmission of FIG. 7.

Referring now also to FIG. 8, for example, a graph is presented of the relationship between vehicle wheel speed (in kilometers per hour) and the speed of motor 174 (in revolutions per minute) for the configuration of MIVT 16 in FIG. 7. Various curves are presented for operation of vehicle 10 with various gears (e.g., range gears) engaged within gear box 202. It will be understood that the quantities represented in FIG. 8 should be viewed as examples only.

Line 212, for example, may represent operation of vehicle 10 in a creeper mode (e.g., under electrical power only). It can be seen that at zero motor speed there may be zero vehicle speed, with non-zero motor speed relating proportionally to vehicle speed. In creeper mode (e.g., with reverse brake 200 and clutch 198 engaged, drive clutch 196 disengaged, and an A range gear (not shown) in gear box 202 engaged), vehicle 10 may accelerate to a transition point. For example, vehicle 10 may accelerate to a point at which, based on the engine speed and relevant gear ratios, ring gear 188 may be relatively stationary even without engagement of brake 200). At this point (or another), clutch 198 may be disengaged and clutch 196 engaged, thereby shifting the vehicle into split-mode drive. At this time (or near this time) motor 174 may then reverse its direction of rotation, thereby transitioning from line 212 to 214. Vehicle 10, accordingly, may continue to accelerate (now driven by both motor 174 and engine 14a), with vehicle speed increasing even as the speed of motor 174 changes direction (i.e., passes from negative rotation to positive rotation). Similar shifts may also be effected, for example, into a B range gear (not shown) from the A range gear (not shown) by transitioning motor 174 from line 214 to line 216, and so on.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. An infinitely variable transmission comprising:
a first planetary gear set including a first transmission component and a second transmission component;
a double planetary gear set including an input component, an output component, a third transmission component, and a fourth transmission component;
a clutch; and
a first brake;
wherein the first transmission component receives a first mechanical power input for the first planetary gear set from an engine;
wherein the third transmission component receive a second mechanical power input for the double planetary gear set from an infinitely variable power source;
wherein the second transmission component directly transmits power to the input component of the double planetary gear set;
wherein the clutch is configured to engage the first transmission component and the second transmission component in order to control power transmission between the first transmission component and the second transmission component;
wherein the first brake is configured to engage the fourth transmission component in order to stop rotation of the fourth transmission component;
wherein the output component is configured to receive mechanical power directly from the input component and the fourth transmission component;
wherein the double planetary gear set is configured to sum mechanical power from the engine and the infinitely variable power source and provide the summed power to the output component; and
wherein, during operation of the engine, controlled actuation of one or more of the first brake and the clutch causes the output component to be powered by the infinitely variable power source but not by the engine.

2. The infinitely variable transmission of claim 1, further comprising:
a fifth transmission component included in the first planetary gear set; and
a second brake configured to engage the fifth transmission component in order to stop rotation of the fifth transmission component;
wherein controlled actuation of the second brake causes a reversed rotation of the second transmission component and the input component.

3. The infinitely variable transmission of claim 1, wherein the first transmission component includes a first planet gear carrier supporting one or more first planet gears.

4. The infinitely variable transmission of claim 3, wherein the second transmission component includes a first sun gear.

5. The infinitely variable transmission of claim 4, wherein the input component includes a first ring gear.

6. The infinitely variable transmission of claim 5, wherein the third transmission component includes a second sun gear.

7. The infinitely variable transmission of claim 6, wherein the fourth transmission component includes a second ring gear.

8. The infinitely variable transmission of claim 1, wherein the output component of the double planetary gear set includes a second planet gear carrier supporting one or more second planet gears, the one or more second planet gears being meshed with one or more of the input component and the fourth transmission component.

9. The infinitely variable transmission of claim 1, wherein the infinitely variable power source includes one or more of a pair of electric machines and a hydrostatic machine.

10. An infinitely variable transmission comprising:
a first planetary gear set including a first input component, a first output component, and a first transmission component;
a double planetary gear set including a second input component, a second transmission component, a third transmission component, and a second output component;
a first clutch;
a second clutch; and
a brake;
wherein the first input component receives a first mechanical power input for the first planetary gear set from an engine;
wherein the second input component receives mechanical power directly from the first output component;
wherein one or more of the first clutch, the second clutch and the brake are configured to engage one or more of the first input component, the first output component, and the first transmission component, in order to control mechanical power transmission between the engine and the double planetary gear set;
wherein one or more of the second and third transmission components receive a second mechanical power input for the double planetary gear set from an infinitely variable power source;
wherein the double planetary gear set is configured to sum mechanical power from the engine and the infinitely variable power source and provide the summed power to the second output component; and
wherein, during operation of the engine, controlled actuation of one or more of the first clutch, the second clutch, and the brake causes the second output component to be powered by the infinitely variable power source but not by the engine.

11. The infinitely variable transmission of claim 10, wherein the first input component includes a first sun gear, the first clutch being configured to engage the first sun gear to control mechanical power transmission between the first sun gear and the engine;
wherein the first transmission component includes a first ring gear, the brake being configured to engage the first ring gear in order to stop rotation of the first ring gear; and
wherein the first output component includes a first planet gear carrier, the second clutch being configured to engage the first planet gear carrier and the first ring gear in order to control mechanical power transmission between the first planet gear carrier and the first ring gear.

12. The infinitely variable transmission of claim 10, wherein the second input component includes a second planet gear carrier, the second planet gear carrier configured to receive mechanical power directly from both the second transmission component and a fourth transmission component included in the double planetary gear set.

13. The infinitely variable transmission of claim 12, wherein the second transmission component includes a second sun gear; and
   wherein the fourth transmission component includes a second ring gear.

14. The infinitely variable transmission of claim 13, wherein the second input component directly transmits mechanical power to a third ring gear included in the double planetary gear set.

15. The infinitely variable transmission of claim 14, wherein the third transmission component includes a third sun gear; and
   wherein a third planet gear carrier supporting one or more planet gears is included in the double planetary gear set, the one or more planet gears being meshed with the third ring gear and the third sun gear.

16. The infinitely variable transmission of claim 12, further comprising:
   a third clutch configured to engage the second output component; and
   a fourth clutch configured to engage the second output component;
   wherein controlled actuation of the third and fourth clutches controls a flow path of mechanical power through the double planetary gear set to the second output component.

17. The infinitely variable transmission of claim 16, wherein the third clutch is configured to engage a third planet gear carrier for transmission of mechanical power between the third planet gear carrier and the second output component; and
   wherein the fourth clutch is configured to controllably engage a second ring included in the double planetary gear set for transmission of mechanical power between the second ring gear and the second output component.

18. An infinitely variable transmission, comprising:
   a double planetary gear set including a first input component, a second input component, and an output component;
   a first clutch;
   a second clutch; and
   a brake;
   wherein the first input component is configured to receive a first mechanical power input for the double planetary gear set from an engine;
   wherein the first clutch is configured to engage the first input component in order to control mechanical power transmission between the first input component and an engine;
   wherein the second input component receives a second mechanical power input for the double planetary gear set from an infinitely variable power source;
   wherein the double planetary gear set is configured to sum mechanical power from the engine and the infinitely variable power source and provide the summed power to the output component; and
   wherein, during operation of the engine, controlled actuation of one or more of the first clutch, the second clutch and the brake causes the output component to be powered by the infinitely variable power source but by not the engine.

19. The infinitely variable transmission of claim 18, wherein the first input component includes a first sun gear and the second input component includes a second sun gear, and wherein the output component includes a second planet gear carrier supporting one or more second planet gears meshed with the second sun gear and a first ring gear of the double planetary gear set, the first ring gear being integral with a first planet gear carrier supporting one or more first planet gears meshed with the first sun gear and a second ring gear of the double planetary gear set.

20. The infinitely variable transmission of claim 19, wherein the second clutch is configured to engage one or more of the second ring gear and the first planet gear carrier in order to control relative motion of the second ring gear and the first planet gear carrier; and
   wherein the brake is configured to engage the second ring gear in order to stop rotation of the second ring gear.

* * * * *